(12) United States Patent
Nagakura

(10) Patent No.: US 8,718,865 B2
(45) Date of Patent: May 6, 2014

(54) ABNORMALITY DIAGNOSIS APPARATUS AND ABNORMALITY DIAGNOSIS METHOD FOR INTERNAL COMBUSTION ENGINE

(75) Inventor: Keisuke Nagakura, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/047,152

(22) Filed: Mar. 14, 2011

(65) Prior Publication Data

US 2011/0224861 A1 Sep. 15, 2011

(30) Foreign Application Priority Data

Mar. 12, 2010 (JP) ................................ 2010-056064

(51) Int. Cl.
*G01M 15/06* (2006.01)

(52) U.S. Cl.
USPC ...... 701/33.6; 701/33.7; 701/34.4; 73/114.04

(58) Field of Classification Search
USPC .................... 701/31.4, 32.8, 33.6, 33.7, 34.4; 73/114.04, 114.05, 114.07, 114.11
See application file for complete search history.

(56) References Cited

U.S. PATENT DOCUMENTS

| | | | | |
|---|---|---|---|---|
| 4,960,083 | A * | 10/1990 | Seki et al. ................... | 123/90.16 |
| 5,222,394 | A * | 6/1993 | Imai ............................ | 73/114.04 |
| 5,268,843 | A * | 12/1993 | Imai ............................ | 701/111 |
| 5,447,061 | A * | 9/1995 | Fujiki ......................... | 73/114.04 |
| 5,548,514 | A * | 8/1996 | Hasegawa et al. ............ | 701/103 |
| 5,862,505 | A * | 1/1999 | Fujiki ........................... | 701/111 |
| 6,006,152 | A * | 12/1999 | Schwarzenthal ............. | 701/102 |
| 6,336,440 | B1 * | 1/2002 | Schmitz et al. ........... | 123/406.27 |
| 6,352,061 | B2 * | 3/2002 | Takahashi ................... | 123/90.15 |
| 6,546,912 | B2 * | 4/2003 | Tuken ........................... | 123/436 |
| 6,701,232 | B2 * | 3/2004 | Yamaki ........................ | 701/33.8 |

(Continued)

FOREIGN PATENT DOCUMENTS

| | | | | |
|---|---|---|---|---|
| JP | 04171253 | A * | 6/1992 | ............. F02D 45/00 |
| JP | 06317115 | A * | 11/1994 | ................ F01L 1/34 |

(Continued)

OTHER PUBLICATIONS

Suzuki Marine Product Information, "DF250SS Four Stroke", 99999-C2049-101, Jul. 2005, 12 pages.*

(Continued)

*Primary Examiner* — Behrang Badii
*Assistant Examiner* — David Testardi
(74) *Attorney, Agent, or Firm* — Gifford, Krass, Sprinkle, Anderson & Citkowski, P.C.

(57) ABSTRACT

An abnormality diagnosis apparatus for an internal combustion engine in which a phase of a first valve provided to a first cylinder is modified within a range extending from a first phase to a second phase and a phase of a second valve provided to a second cylinder is modified within the range includes: a rotation variation amount detection unit that detects a rotation variation amount of an output shaft of the internal combustion engine; and a diagnosis unit that adjusts the phase of the first valve and the phase of the second valve to the first phase, and diagnoses the presence of an abnormality on the basis of the detected rotation variation amount of the output shaft of the internal combustion engine in a state where the phase of the first valve and the phase of the second valve are at the first phase.

8 Claims, 7 Drawing Sheets

(56) References Cited

U.S. PATENT DOCUMENTS

| | | | |
|---|---|---|---|
| 7,032,550 B2 * | 4/2006 | Ohtsuka et al. | 123/90.16 |
| 7,036,358 B2 * | 5/2006 | Nisimura | 73/114.63 |
| 7,117,727 B2 * | 10/2006 | Ohsaki et al. | 73/114.04 |
| 7,117,728 B2 * | 10/2006 | Kiyomura et al. | 73/114.04 |
| 7,146,851 B2 * | 12/2006 | Wakahara et al. | 73/114.72 |
| 7,588,013 B2 * | 9/2009 | Ichimoto | 123/347 |
| 7,937,992 B2 * | 5/2011 | Akimoto et al. | 73/114.03 |
| 2009/0048729 A1 * | 2/2009 | Waters et al. | 701/29 |
| 2010/0017098 A1 | 1/2010 | Fukuchi et al. | |

FOREIGN PATENT DOCUMENTS

| | | | | | |
|---|---|---|---|---|---|
| JP | 2001020798 | A * | 1/2001 | | F02D 45/00 |
| JP | 2003049671 | A * | 2/2003 | | F02D 13/02 |
| JP | 2003336528 | A * | 11/2003 | | F02D 13/02 |
| JP | 2004116405 | A * | 4/2004 | | F02D 13/02 |
| JP | 2005248812 | A * | 9/2005 | | F02D 41/22 |
| JP | 2007120469 | A * | 5/2007 | | |
| JP | 2007231798 | A | 9/2007 | | |
| JP | 2007270668 | A | 10/2007 | | |
| JP | 2009137531 | A * | 6/2009 | | |
| JP | 2009203880 | A | 9/2009 | | |
| JP | 2010024977 | A | 2/2010 | | |

OTHER PUBLICATIONS

Office Action from corresponding Japanese application No. 2010-056064 dated Oct. 11, 2011; 4 pgs.

* cited by examiner

ABNORMALITY DIAGNOSIS APPARATUS AND ABNORMALITY DIAGNOSIS METHOD FOR INTERNAL COMBUSTION ENGINE

INCORPORATION BY REFERENCE

The disclosure of Japanese Patent Application No. 2010-056064 filed on Mar. 12, 2010, including the specification, drawings and abstract, is incorporated herein by reference in its entirety.

BACKGROUND OF THE INVENTION

1. Field of the Invention

The invention relates to an abnormality diagnosis apparatus and an abnormality diagnosis method for an internal combustion engine, and more particularly to an abnormality diagnosis apparatus and an abnormality diagnosis method for diagnosing an abnormality on the basis of a rotation variation amount of an output shaft of an internal combustion engine provided with a plurality of variable valve timing (VVT) mechanisms.

2. Description of the Related Art

An internal combustion engine provided with a plurality of cylinders is available. Typically, control is performed such that all of the cylinders have an identical air-fuel ratio. However, when the internal combustion engine is operated over a long time period, differences may occur among the respective air-fuel ratios of the cylinders due to deterioration of an injector provided in each cylinder, individual differences, and so on. When differences occur among the respective air-fuel ratios of the cylinders, differences may occur in a torque obtained in a combustion stroke of each cylinder. Hence, in one proposed method, rotation variation in an output shaft of the internal combustion engine is used to detect an abnormality according to which the cylinders have different air-fuel ratios.

Japanese Patent Application Publication No. 2010-24977 (JP-A-2010-24977) discloses a diagnosis control apparatus for an internal combustion engine that controls an amount of fuel injected into each cylinder and diagnoses the presence and extent of air-fuel ratio or output variation among the cylinders. The diagnosis control apparatus measures a time required for a crankshaft to rotate by a predetermined angle in relation to each cylinder, extracts a 0.5 order component serving as a rotation variation component for each two revolutions of the crankshaft or a 1.0 order component serving as a rotation variation component for each single revolution of the crankshaft in relation to each cylinder on the basis of the measured required time, counts the number of times the 0.5 order component or the 1.0 order component deviates from a set range within a set time period in relation to each cylinder, and diagnoses an abnormality in the air-fuel ratio or output of the corresponding cylinder when the count value exceeds a predetermined value.

In a V type engine or a horizontally opposed engine provided with a VVT mechanism that modifies an opening/closing phase (a crank angle) of an intake valve and an exhaust valve in accordance with operating conditions, a first bank is provided with a separate VVT mechanism to a VVT mechanism provided in a second bank. Therefore, even when the internal combustion engine is normal, the phase of the valves in the first bank and the phase of the valves in the second bank may differ within an allowable range. Even in this case, air-fuel ratio variation may occur between the cylinders of the first bank and the cylinders of the second bank. Hence, when the presence of an abnormality is diagnosed on the basis of the amount of rotation variation in the output shaft of the engine, an abnormality may be detected erroneously.

SUMMARY OF INVENTION

The invention provides an abnormality diagnosis apparatus and an abnormality diagnosis method for an internal combustion engine with which the presence of an abnormality can be diagnosed with precision.

A first aspect of the invention relates to an abnormality diagnosis apparatus for an internal combustion engine provided with a first VVT mechanism that modifies a phase of a first valve provided to a first cylinder within a range extending from a first phase to a second phase and a second VVT mechanism that modifies a phase of a second valve provided to a second cylinder, which is separate from the first cylinder, within the range extending from the first phase to the second phase. The abnormality diagnosis apparatus includes: a rotation variation amount detection unit that detects a rotation variation amount of an output shaft of the internal combustion engine; and a diagnosis unit that adjusts the phase of the first valve and the phase of the second valve to the first phase, and diagnoses the presence of an abnormality on the basis of the detected rotation variation amount of the output shaft of the internal combustion engine in a state where the phase of the first valve and the phase of the second valve are at the first phase.

According to this constitution, both the phase of the first valve varied by the first VVT mechanism and the phase of the second valve varied by the second VVT mechanism are set at a most retarded phase or a most advanced phase, which are determined mechanically. In this state, the presence of an abnormality is diagnosed on the basis of the rotation variation amount of the output shaft. Hence, the presence of an abnormality can be diagnosed on the basis of the rotation variation amount of the output shaft of the internal combustion engine in a state where the phase of the first valve varied by the first VVT mechanism and the phase of the second valve varied by the second VVT mechanism are identical. Thus, a phase difference between the valves of the cylinders can be excluded from factors causing rotation variation in the output shaft of the internal combustion engine, and as a result, an abnormality diagnosis apparatus for an internal combustion engine that is capable of diagnosing the presence of an abnormality with precision can be provided.

A second aspect of the invention relates to an abnormality diagnosis apparatus for an internal combustion engine provided with a first VVT mechanism that modifies a phase of a first valve provided to a first cylinder within a range extending from a first phase to a second phase and a second VVT mechanism that modifies a phase of a second valve provided to a second cylinder, which is separate from the first cylinder, within the range extending from the first phase to the second phase. This abnormality diagnosis apparatus includes: a rotation variation amount detection unit that detects a rotation variation amount of an output shaft of the internal combustion engine; a first phase detection unit that detects the phase of the first valve; a second phase detection unit that detects the phase of the second valve; and a diagnosis unit that diagnoses the presence of an abnormality on the basis of the detected rotation variation amount of the output shaft of the internal combustion engine when a predetermined condition including a condition under which the detected phase of the first valve and the detected phase of the second valve are identical is satisfied.

According to this constitution, when the phase of the first valve and the phase of the second valve are identical, the presence of an abnormality is diagnosed on the basis of the rotation variation amount of the output shaft. When the phase of the first valve and the phase of the second valve are different, the abnormality diagnosis based on the rotation variation amount of the output shaft is not performed. Thus, a phase difference between the valves of the cylinders can be excluded from factors causing rotation variation in the output shaft of the internal combustion engine, and as a result, an abnormality diagnosis apparatus for an internal combustion engine that is capable of diagnosing the presence of an abnormality with precision can be provided.

A third aspect of the invention relates to an abnormality diagnosis method for an internal combustion engine provided with a first VVT mechanism that modifies a phase of a first valve provided to a first cylinder and a second VVT mechanism that modifies a phase of a second valve provided to a second cylinder. The abnormality diagnosis method includes: detecting a rotation variation amount of an output shaft of the internal combustion engine; and diagnosing the presence of an abnormality in the internal combustion engine on the basis of the detected rotation variation amount of the output shaft of the internal combustion engine when the phase of the first valve matches the phase of the second valve.

BRIEF DESCRIPTION OF DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
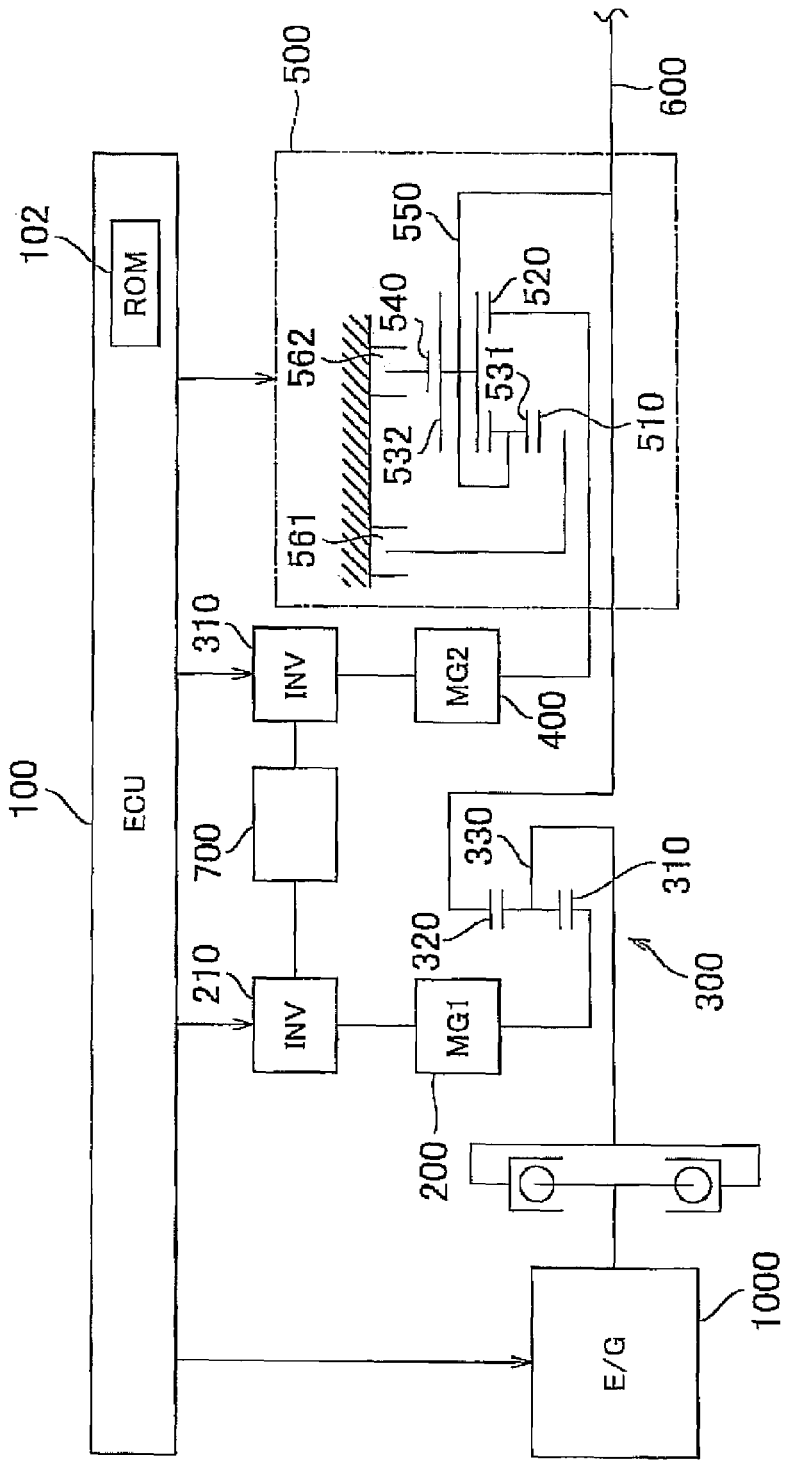
FIG. 1 is a schematic diagram showing a power train of a hybrid vehicle.

Embodiments of the invention will be described below with reference to the drawings. In the following description, identical components have been allocated identical reference numerals. The names and functions thereof are also identical. Accordingly, detailed description of such components will not be repeated.

Referring to FIG. 1, a power train of a hybrid vehicle installed with an abnormality diagnosis apparatus according to an embodiment of the invention will be described. The abnormality diagnosis apparatus according to this embodiment is realized by causing an ECU 100 to execute a program recorded in a Read-Only Memory (ROM) 102 of the ECU 100. Note that the ECU 100 may be divided into a plurality of ECUs. Further, the program executed by the ECU 100 may be recorded on a recording medium such as a Compact Disc (CD) or a Digital Versatile Disc (DVD) and distributed to a market. A vehicle installed with only an engine as a drive source may be used instead of a hybrid vehicle.

As shown in FIG. 1, the power train is mainly constituted by an engine 1000, a first motor/generator (MG) 200, a power distribution mechanism 300 that synthesizes or distributes torque between the engine 1000 and the first MG 200, a second MG 400, and a transmission 500.

The engine 1000 is a conventional internal combustion engine that outputs power by burning a fuel, in which operating conditions such as a throttle opening (an intake air amount), a fuel supply amount, and an ignition timing can be electrically controlled. This control is performed by the ECU 100, which is constituted mainly by a microcomputer, for example. Note that the engine 1000 will be described in detail below.

The first MG 200 is a three-phase alternating current dynamo-electric machine, for example, which functions as a motor and a power generator. The first MG 200 is connected to a storage device 700 such as a battery via an inverter 210. An output torque or a regenerative torque of the first MG 200 is set appropriately by controlling the inverter 210. This control is performed by the ECU 100. Note that a stator (not shown) of the first MG 200 is fixed and does not therefore rotate.

The power distribution mechanism 300 is a conventional gear mechanism that generates a differential action using three rotary elements, namely a sun gear (S) 310 serving as an external gear, a ring gear (R) 320 serving as an internal gear disposed concentrically with the sun gear (S) 310, and a carrier (C) 330 that carries a pinion gear meshed to the sun gear (S) 310 and the ring gear (R) 320 so that the pinion gear is free to spin and revolve. An output shaft of the engine 1000 is coupled to the carrier (C) 330, which constitutes a first rotary element, via a damper. In other words, the carrier (C) 330 serves as an input element.

Meanwhile, a rotor (not shown) of the first MG 200 is coupled to the sun gear (S) 310, which constitutes a second rotary element. Hence, the sun gear (S) 310 serves as a so-called reaction element and the ring gear (R) 320, which constitutes a third rotary element, serves as an output element. The ring gear (R) 320 is coupled to an output shaft 600 coupled to a drive wheel (not shown).

Figure 2:
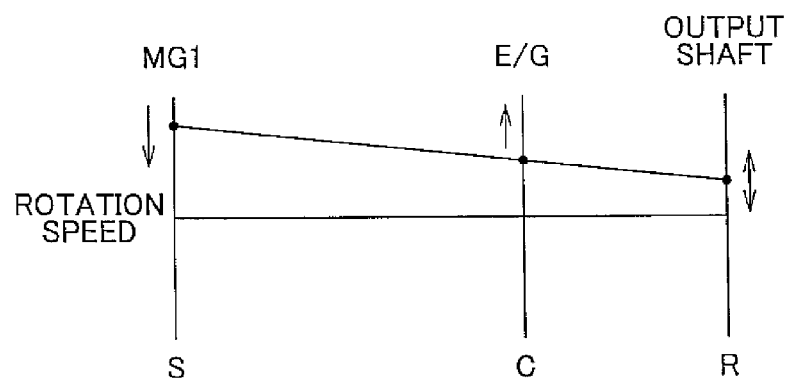
FIG. 2 is a collinear diagram of a power distribution mechanism.

FIG. 2 is a collinear diagram of the power distribution mechanism 300. As shown in FIG. 2, when a reaction torque generated by the first MG 200 is input into the sun gear (S) 310 in response to torque input into the carrier (C) 330 and output by the engine 1000, torque having a magnitude obtained by adding or subtracting these torques appears in the ring gear (R) 320 serving as the output element. In this case, the rotor of the first MG 200 is rotated by this torque such that the first MG 200 functions as a power generator. Further, when a rotation speed (output rotation speed) of the ring gear (R) 320 is fixed, a rotation speed of the engine 1000 can be varied continuously (in a non-stage manner) by increasing or decreasing the rotation speed of the first MG 200. In other words, by controlling the first MG 200, control can be performed to set the rotation speed of the engine 1000 at an optimum rotation speed in terms of fuel efficiency, for example. This control is performed by the ECU 100.

When the engine 1000 is stopped during travel, the first MG 200 rotates in reverse, and when the first MG 200 is caused to function as a motor from this state such that torque is output in a positive rotation direction, torque acts on the engine 1000 coupled to the carrier (C) 330 in a direction for causing the engine 1000 to rotate positively, whereby the engine 1000 can be started (motored or cranked) by the first MG 200. In this case, torque acts on the output shaft 600 in a direction for stopping rotation thereof. Hence, a drive torque required for travel can be maintained by controlling torque output by the second MG 400, and at the same time, the engine 1000 can be started smoothly. Note that this type of hybrid system is available as a mechanical distribution system or a split system.

Returning to FIG. 1, the second MG 400 is a three-phase alternating current dynamo-electric machine, for example, which functions as a motor and a power generator. The second MG 400 is connected to the storage device 700 constituted by a battery or the like via an inverter 310. Torque generated by the second MG 400 during both power running and regeneration is controlled by controlling the inverter 310. Note that a stator (not shown) of the second MG 400 is fixed and does not therefore rotate.

The transmission 500 is constituted by a set of Ravigneaux type planetary gear mechanisms. A first sun gear (S1) 510 and a second sun gear (S2) 520 are provided respectively as external gears, a first pinion 531 is meshed to the first sun gear (S1) 510 and to a second pillion 532, and the second pinion 532 is meshed to a ring gear (R) 540 disposed concentrically with the respective sun gears 510, 520.

The pinions 531, 532 are carried by a carrier (C) 550 to be free to revolve and spin. Further, the second sun gear (S2) 520 is meshed to the second pinion 532. Thus, the first sun gear (S1) 510 and the ring gear (R) 540 form a mechanism corresponding to a double pinion type planetary gear mechanism together with the respective pinions 531, 532 while the second sun gear (S2) 520 and the ring gear (R) 540 form a mechanism corresponding to a single pinion type planetary gear mechanism together with the second pinion 532.

The transmission 500 is further provided with a B1 brake 561 that fixes the first sun gear (S1) 510 selectively and a B2 brake 562 that fixes the ring gear (R) 540 selectively. The brakes 561, 562 are so-called frictional engagement elements that generate an engagement force using a frictional force, and may be constituted by multiple disc type engagement devices or band type engagement devices. The brakes 561, 562 are formed such that a torque capacity thereof varies continuously in accordance with an engagement force generated by oil pressure. Further, the aforesaid second MG 400 is coupled to the second sun gear (S2) 520. The carrier (C) 550 is coupled to the output shaft 600.

Hence, in the transmission 500 described above, the second sun gear (S2) 520 is a so-called input element, the carrier (C) 550 is an output element, and by engaging the B1 brake 561, a high gear having a larger speed ratio than "1" is set. By engaging the B2 brake 562 instead of the B1 brake 561, a low gear having a larger speed ratio than the high gear is set.

A shift between these gear positions is executed on the basis of traveling conditions such as a vehicle speed and a required driving force (or an accelerator opening). More specifically, gear position regions are determined in advance in the form of a map (a shift line diagram), and control is performed to set one of the gear positions in accordance with detected operating conditions.

Figure 3:
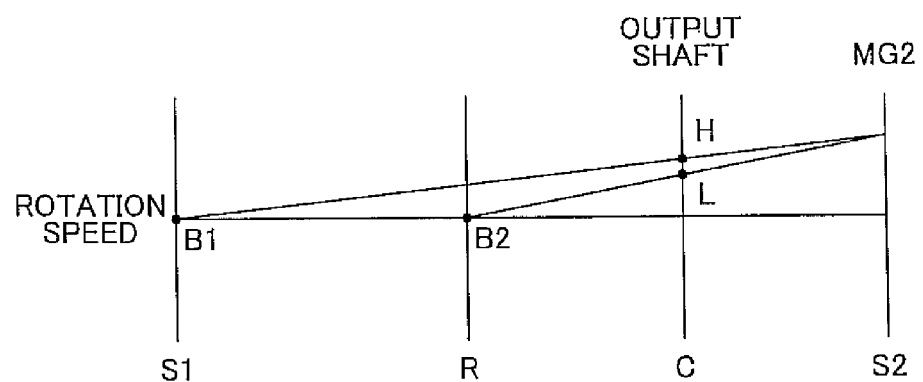
FIG. 3 is a collinear diagram of a transmission.

FIG. 3 is a collinear diagram showing the transmission 500. As shown in FIG. 3, when the ring gear (R) 540 is fixed by the B2 brake 562, a low gear L is set, whereby the torque output by the second MG 400 is amplified in accordance with the speed ratio and applied to the output shaft 600. When the first sun gear (S1) 510 is fixed by the B1 brake 561, on the other hand, a high gear H having a smaller speed ratio than the low gear L is set. The speed ratio in the high gear H is still larger than "1", and therefore the torque output by the second MG 400 is increased in accordance with the speed ratio and applied to the output shaft 600.

In a state where the gear positions L, H are set steadily, the torque applied to the output shaft 600 is obtained by increasing the output torque of the second MG 400 in accordance with the speed ratio, whereas in a shift transition state, the torque applied to the output shaft 600 is affected by the torque capacity of the brakes 561, 562, inertial torque accompanying rotation speed variation, and so on. Further, the torque applied to the output shaft 600 is positive torque when the second MG 400 is driven and negative torque when the second MG 400 is not driven.

In this embodiment, the hybrid vehicle travels in one of a first travel mode in which only a driving force of the engine 1000 is used, a second travel mode in which the engine 1000 is stopped and only a driving force of the second MG 400 is used, and a third travel mode in which the driving force of both the engine 1000 and the second MG 400 is used. The travel mode is selected on the basis of various parameters such as the accelerator opening and a residual capacity of the storage device 700.

Note that a conventional technique available in the technical field of hybrid vehicles may be employed as a travel mode selection method, and therefore further description of this method will not be repeated here. Furthermore, the number of modes is not limited to three.

Figure 4:
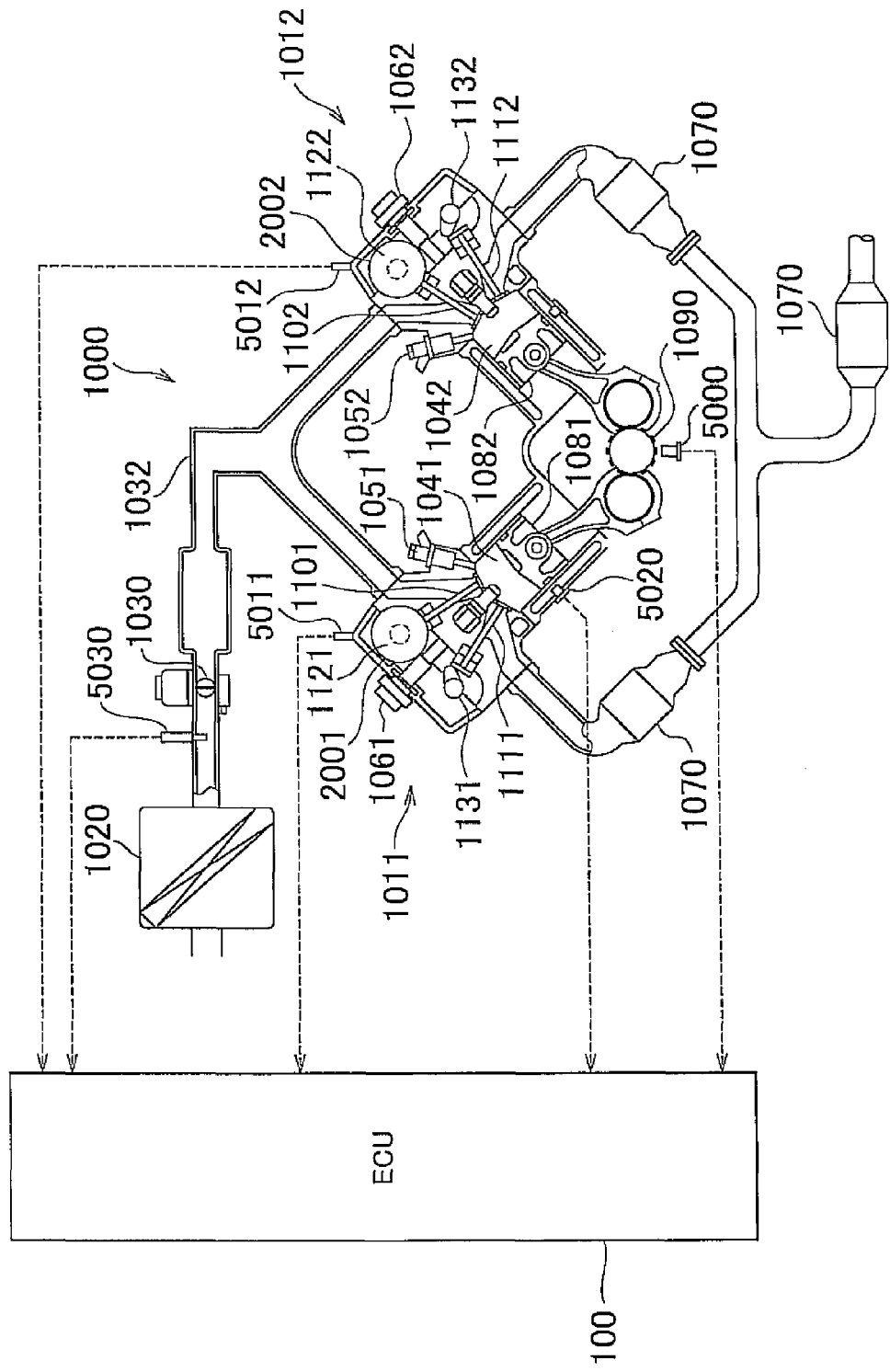
FIG. 4 is a schematic diagram showing an engine of the hybrid vehicle.

Referring to FIG. 4, the engine 1000 will be described in further detail. The engine 1000 is a V type engine provided with an A bank 1011 and a B bank 1012. Note that a horizontally opposed engine may also be used.

Air is aspirated into the engine 1000 through an air cleaner 1020. An intake air amount is adjusted by a throttle valve 1030. The throttle valve 1030 is an electronic throttle valve driven by a motor.

The air is introduced into four cylinder 1041 provided in the A bank 1011 and four cylinders 1042 provided in the B bank 1012 through an intake air passage 1032. The total number of cylinders may be 6, 10, 12, or another number.

The air mixes with a fuel in the cylinders 1041, 1042. The fuel is injected directly into the respective cylinders 1041 of the A bank 1011 from injectors 1051 provided singly in relation to each cylinder 1041. Similarly, the fuel is injected directly into the respective cylinders 1042 of the B bank 1012 from injectors 1052 provided singly in relation to each cylinder 1042. The fuel is injected during an intake stroke. Note that the fuel injection timing is not limited to the intake stroke.

In this embodiment, the engine 1000 is a direct injection engine in which injection holes of the injectors 1051, 1052 are provided inside the cylinders 1041, 1042, but port-injection injectors may be provided in addition to the direct-injection injectors 1051, 1052. Moreover, port-injection injectors may be provided alone.

An air-fuel mixture in the cylinders 1041 of the A bank 1011 is ignited so as to burn by spark plugs 1061 provided singly in relation to each cylinder 1041. Similarly, an air-fuel mixture in the cylinders 1042 of the B bank 1012 is ignited so as to burn by spark plugs 1062 provided singly in relation to each cylinder 1042. The burned air-fuel mixture, or in other words exhaust gas, is purified by a three-way catalyst 1070 and then discharged to the exterior of the vehicle. When the air-fuel mixture is burned, a piston 1081 provided in relation to each cylinder 1041 of the A bank 1011 and a piston 1082 provided in relation to each cylinder 1042 of the B bank 1012 are pushed down, causing a crankshaft 1090 to rotate.

Intake valves 1101, 1102 and exhaust valves 1111, 1112 are provided on respective crown portions of the cylinders 1041, 1042.

The intake valve 1101 provided in relation to the cylinders 1041 in the A bank 1011 is driven by an intake cam shaft 1121. The exhaust valve 1111 provided in relation to the cylinders 1041 in the A bank 1011 is driven by an exhaust cam shaft 1131.

Similarly, the intake valve 1102 provided in relation to the cylinders 1042 in the B bank 1012 is driven by an intake cam shaft 1122, and the exhaust valve 1112 provided in relation to the cylinders 1042 in the B bank 1012 is driven by an exhaust cam shaft 1132. The intake cam shaft 1121 and the exhaust cam shaft 1131 of the A bank 1011 are coupled by a chain, a gear, or the like, and rotate at an identical rotation speed. Similarly, the intake cam shaft 1122 and the exhaust cam shaft 1132 of the B bank 1012 are coupled by a chain, a gear, or the like, and rotate at an identical rotation speed.

A phase (an opening/closing timing) of the intake valve 1101 in the A bank 1011 is controlled by a VVT mechanism 2001 provided in the intake cam shaft 1121. Similarly, a phase of the intake valve 1102 in the B bank 1012 is controlled by a VVT mechanism 2002 provided in the intake cam shaft 1122.

In this embodiment, the phases of the intake valves 1101, 1102 are controlled by rotating the intake cam shafts 1121, 1122 using the VVT mechanisms 2001, 2002, but the phase control method is not limited thereto.

Note that a VVT mechanism for controlling the phase of the exhaust valve 1111 in the A bank 1011 and a VVT mechanism for controlling the phase of the exhaust valve 1112 in the B bank 1012 may be provided.

The VVT mechanism 2001 of the A bank 1011 and the VVT mechanism 2002 of the B bank 2002 operate using oil pressure. A typical conventional VVT mechanism may be used as the VVT mechanisms 2001, 2002, and therefore further detailed description thereof will not be repeated here. Note that the VVT mechanisms 2001, 2002 may be operated by an electric motor.

The VVT mechanisms 2001, 2002 are controlled by the ECU 100. More specifically, an oil pressure supplied to the VVT mechanisms 2001, 2002 and an oil pressure discharged from the VVT mechanisms 2001, 2002 are controlled by the ECU 100.

A pulse signal indicating a crank angle of the crankshaft 1090 is input into the ECU 100 from a crank angle sensor 5000. On the basis of the pulse signal input from the crank angle sensor 5000, the ECU 100 detects a rotation speed NE of the engine 1000. Note that a typical conventional method may be used as the method of detecting the engine rotation speed NE, and therefore detailed description of this method will not be repeated here.

Further, a pulse signal (a signal indicating the phase of the intake valve 1101) indicating a phase (a cam shaft position in a rotation direction) of the intake cam shaft 1121 is input into the ECU 100 from a cam position sensor 5011 of the A bank 1011. Similarly, a pulse signal (a signal indicating the phase of the intake valve 1102) indicating the phase of the intake cam shaft 1122 is input into the ECU 100 from a cam position sensor 5012 of the B bank 1012.

Furthermore, a signal indicating a water temperature (a cooling water temperature) of the engine 1000 and a signal indicating the intake air amount of the engine 1000 (the amount of air aspirated into the engine 1000) are input into the ECU 100 from a water temperature sensor 5020 and an air flow meter 5030, respectively.

On the basis of signals input from these sensors as well as a map and a program stored in the ROM 102, the ECU 100 controls a throttle opening, an ignition timing, the fuel injection timing, a fuel injection amount, the phases of the intake valves 1101, 1102, and so on such that a desired operating state is established in the engine 1000.

Figure 5:
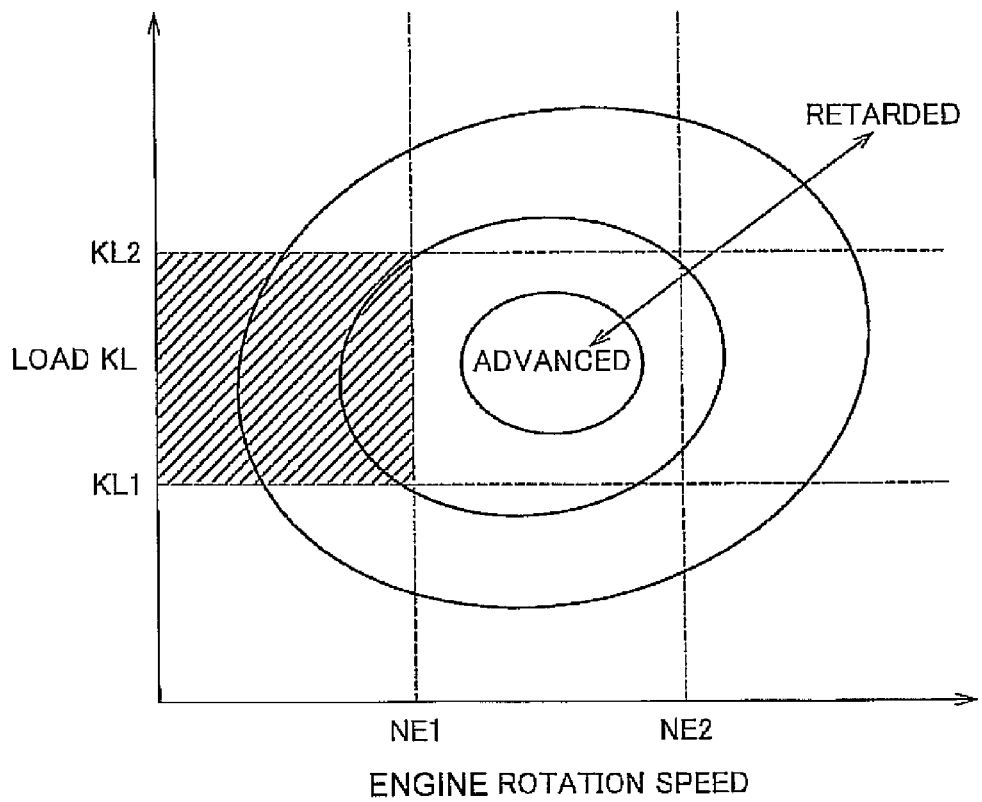
FIG. 5 is a view showing a map defining a phase of an intake valve.

As shown in FIG. 5, the ECU 100 determines the phases of the intake valves 1101, 1102 on the basis of a map having a load KL of the engine 1000 and the engine rotation speed NE as parameters. In other words, the phases of the intake valves 1101, 1102 are controlled to vary in accordance with the engine rotation speed NE and the load KL. Further, a map for determining the phases of the intake valves 1101, 1102 is provided in a plurality corresponding to water temperatures. As will be described below, the presence of an air-fuel ratio abnormality is diagnosed in a low-rotation medium-load region indicated by shading in FIG. 5.

Figure 6:
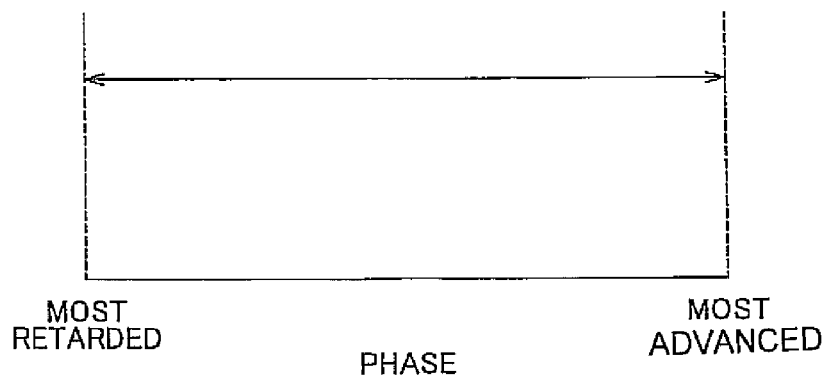
FIG. 6 is a view showing a range of phase variation.

As shown in FIG. 6, the phase of the intake valves 1101, 1102 is controlled to vary between a most retarded phase and a most advanced phase. The most retarded phase and the most advanced phase are determined as required by the structure of the VVT mechanisms 2001, 2002.

Figure 7:
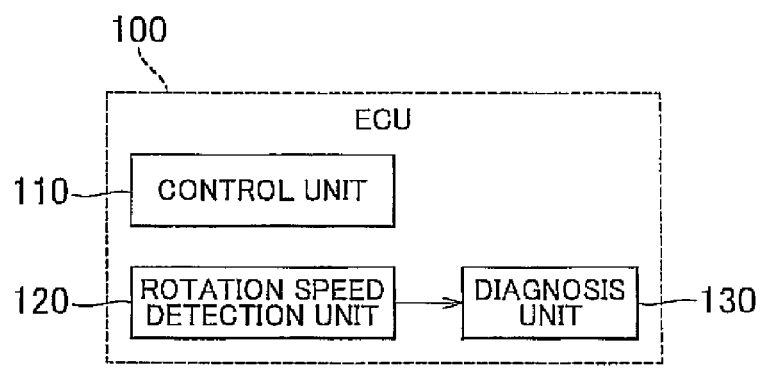
FIG. 7 is a functional block diagram of an Electronic Control Unit (ECU) according to a first embodiment.

Referring to FIG. 7, functions of the ECU 100 will be described. Note that the functions of the ECU 100 to be described below may be realized using hardware or software.

The ECU 100 includes a control unit 110, a rotation variation amount detection unit 120, and a diagnosis unit 130.

The control unit 110 controls the VVT mechanisms 2001, 2002 such that the phases of the intake valves 1101, 1102 vary in accordance with the engine rotation speed NE and the load.

The rotation variation amount detection unit 120 detects a rotation variation amount of an output shaft (the crankshaft 1090) of the engine 1000 on the basis of the signal input from the crank angle sensor 5000. For example, a time required for the crankshaft 1090 to rotate by a predetermined angle is measured, and a difference between a maximum value and a minimum value of the measured time is detected as the rotation variation amount. Alternatively, for example, an angular velocity during a predetermined number of revolutions (two revolutions, for example) of the crankshaft 1090 may be determined from the measured time, and a difference between a maximum value and a minimum value of the angular velocity may be detected as the rotation variation amount. The rotation variation amount may be detected using any other typical conventional technique, and therefore further detailed description thereof will not be repeated here.

When a predetermined diagnosis execution condition is satisfied, the diagnosis unit 130 controls the VVT mechanisms 2001, 2002 to set the phase of the intake valve 1101 of the A bank 1011 and the phase of the intake valve 1102 of the B bank 1012 at the most retarded phase. Note that the diagnosis unit 130 may control the WT mechanisms 2001, 2002 to set the phase of the intake valve 1101 of the A bank 1011 and the phase of the intake valve 1102 of the B bank 1012 at the most advanced phase. However, when the phases are set at the most advanced phase, an overlap between the intake valves 1101, 1102 and the exhaust valves 1111, 1112 is large, leading to an increase in an internal EGR amount. In this case, the rotation variation amount of the crankshaft 1090 may be increased by the difference in the internal EGR amount between the cylinders 1041, 1042, and therefore the phases are preferably set at the most retarded phase.

Further, when the diagnosis execution condition is satisfied, the diagnosis unit 130 diagnoses the presence of an air-fuel ratio abnormality on the basis of the rotation variation amount of the crankshaft 1090 in a state where the phase of the intake valve 1101 of the A bank 1011 and the phase of the intake valve 1102 of the B bank 1012 have been set at the most retarded phase. When the rotation variation amount of the crankshaft 1090 equals or exceeds a threshold, for example, it is determined that an air-fuel ratio difference between the cylinders is large, and therefore that an abnormality has occurred. Note that a typical conventional technique may be used as a method of diagnosing the presence of an air-fuel ratio abnormality on the basis of the rotation variation amount of the crankshaft 1090, and therefore further detailed description of this method will not be repeated here.

Figure 8:
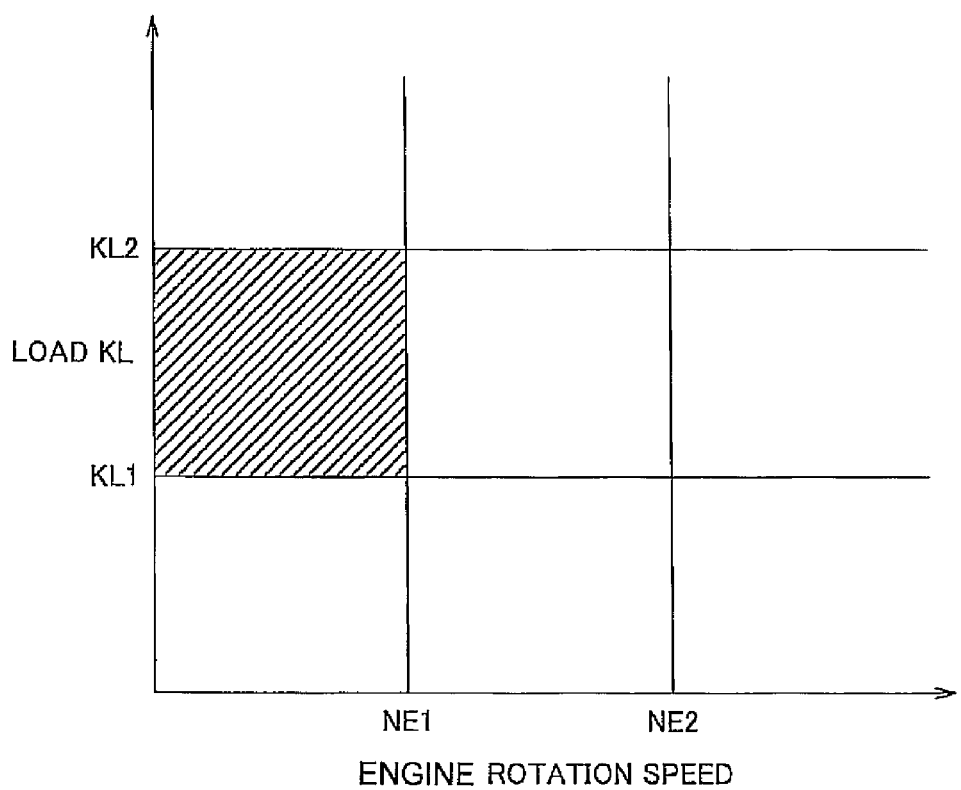
FIG. 8 is a view showing an operating region in which diagnosis of an air-fuel ratio abnormality is performed.

The diagnosis execution condition is satisfied, for example, when the operating state of the engine 1000 is in a low-rotation medium-load region indicated by shading in FIG. 8. More specifically, the diagnosis execution condition is satisfied when the load of the engine 1000 is not smaller than a predetermined load KL1 and not larger than a load KL2, which is larger than the load KL1, and the rotation speed of the engine 1000 is not larger than a predetermined rotation speed NE1. Hence, in this embodiment, an air-fuel ratio abnormality is diagnosed as the hybrid vehicle travels. The load KL1, the load KL2, and the rotation speed NE1 have been determined in advance by a developer on the basis of experiments, simulations, and so on. The load KL1 is a load that is larger than a load of the internal combustion engine in an idling state as indicated by FIG. 8. Note that the diagnosis execution condition may include another condition.

The low-rotation medium-load region indicated by shading in FIG. 8 is an operating region where the operating state of the engine 1000 can achieve stability. In a hybrid vehicle, the engine 1000 is stopped frequently during travel and when the vehicle stops, and it is therefore difficult to obtain opportunities to diagnose an air-fuel ratio abnormality. Hence, an air-fuel ratio abnormality is diagnosed in the low-rotation medium-load region in order to secure an opportunity to diagnose an air-fuel ratio abnormality during travel.

Figure 9:
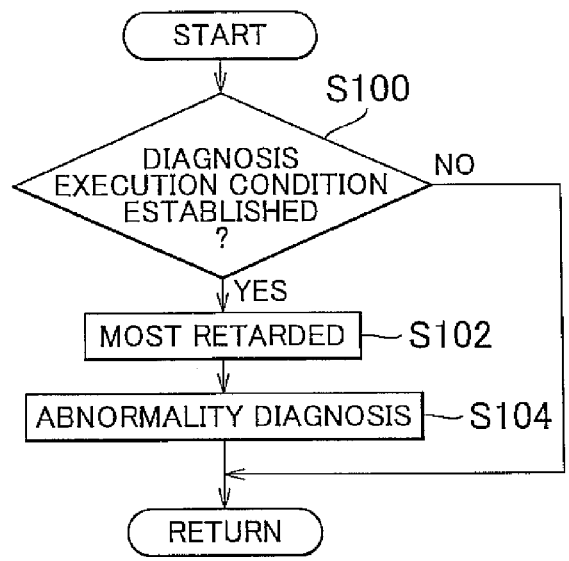
FIG. 9 is a flowchart showing a control structure of a program executed by the ECU according to the first embodiment.

Referring to FIG. 9, a processing procedure executed by the ECU 100 will be described. In a step (to be abbreviated to S hereafter) 100, the ECU 100 determines whether or not the diagnosis execution condition is satisfied. When the diagnosis execution condition is satisfied (YES in S100), the processing is advanced to S102. When the condition is not satisfied (NO in S100), the processing is returned to S100.

In S102, the ECU 100 controls the VVT mechanisms 2001, 2002 to set the phase of the intake valve 1101 of the A bank 1011 and the phase of the intake valve 1102 of the B bank 1012 at the most retarded phase.

In S104, the ECU 100 diagnoses the presence of an air-fuel ratio abnormality on the basis of the rotation variation amount of the crankshaft 1090 in a state where the phase of the intake valve 1101 of the A bank 1011 and the phase of the intake valve 1102 of the B bank 1012 have been set at the most retarded phase.

Thus, the presence of an abnormality can be diagnosed on the basis of the rotation variation amount of the crankshaft 1090 in a state where the phase of the intake valve 1101 varied by the VVT mechanism 2001 of the A bank 1011 and the phase of the intake valve 1102 varied by the VVT mechanism 2002 of the B bank 1012 are identical. In so doing, a phase difference between the intake valves 1101, 1102 of the cylinders 1041, 1042 can be excluded from factors causing rotation variation in the crankshaft 1090, and as a result, the presence of an abnormality can be diagnosed with precision.

Figure 10:
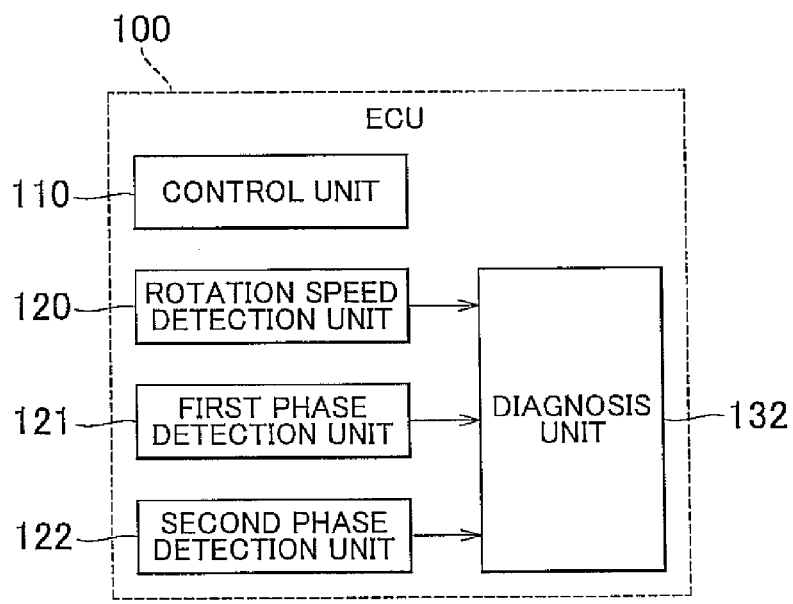
FIG. 10 is a functional block diagram of an ECU according to a second embodiment.

A second embodiment of the invention will be described below. Referring to FIG. 10, functions of the ECU 100 according to this embodiment will be described. Note that the functions of the ECU 100 to be described below may be realized using hardware or software.

The ECU 100 includes the control unit 110, the rotation variation amount detection unit 120, a first phase detection unit 121, a second phase detection unit 122, and a diagnosis unit 132. The control unit 110 and the rotation variation amount detection unit 120 are identical to the control unit 110 and the rotation variation amount detection unit 120 according to the first embodiment described above, and therefore detailed description thereof will not be repeated here.

The first phase detection unit 121 detects the phase of the intake valve 1101 of the A bank 1011 on the basis of the pulse signal input from the cam position sensor 5011 of the A bank 1011.

The second phase detection unit 122 detects the phase of the intake valve 1102 of the B bank 1012 on the basis of the pulse signal input from the cam position sensor 5012 of the B bank 1012.

When a predetermined diagnosis execution condition is satisfied, the diagnosis unit 132 diagnoses the presence of an air-fuel ratio abnormality on the basis of the rotation variation amount of the crankshaft 1090. In this embodiment, the diagnosis execution condition includes a condition whereby the phase of the intake valve 1101 of the A bank 1011 and the phase of the intake valve 1102 of the B bank 1012 are identical. In other words, in this embodiment, the diagnosis execution condition includes both the condition whereby the phase of the intake valve 1101 of the A bank 1011 and the phase of the intake valve 1102 of the B bank 1012 are identical and the condition whereby the load of the engine 1000 is not smaller than the load KL1 and not larger than the load KL2, which is larger than the load KL1, and the rotation speed of the engine 1000 is not larger than the predetermined rotation speed NE1.

Figure 11:
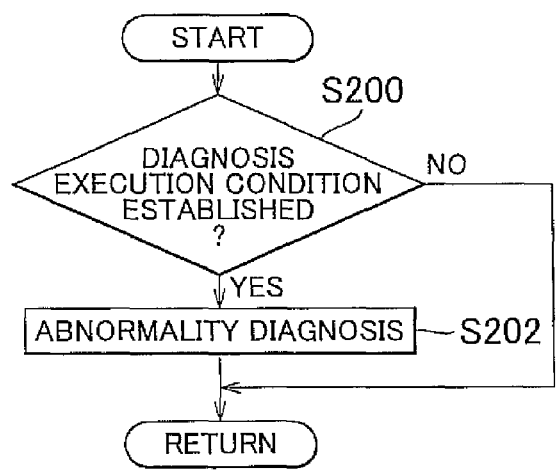
FIG. 11 is a flowchart showing a control structure of a program executed by the ECU according to the second embodiment.

Referring to FIG. 11, a processing procedure executed by the ECU 100 according to this embodiment will be described.

In a step (to be abbreviated to S hereafter) 200, the ECU 100 determines whether or not the diagnosis execution condition is satisfied. When the diagnosis execution condition is satisfied (YES in S200), the processing is advanced to S202. When the condition is not satisfied (NO in S200), the processing is returned to S200.

In S202, the ECU 100 diagnoses the presence of an air-fuel ratio abnormality on the basis of the rotation variation amount of the crankshaft 1090.

Thus, similarly to the first embodiment described above, the presence of an abnormality can be diagnosed on the basis of the rotation variation amount of the crankshaft 1090 in a state where the phase of the intake valve 1101 varied by the VVT mechanism 2001 of the A bank 1011 and the phase of the intake valve 1102 varied by the VVT mechanism 2002 of the B bank 1012 are identical. In so doing, a phase difference between the intake valves 1101, 1102 of the cylinders 1041, 1042 can be excluded from factors causing rotation variation in the crankshaft 1090, and as a result, the presence of an abnormality can be diagnosed with precision.

Outlines of embodiments of the invention will be provided below.

One of the embodiments relates to an abnormality diagnosis apparatus for an internal combustion engine provided with a first VVT mechanism that modifies a phase of a first valve provided to a first cylinder within a range extending from a first phase to a second phase and a second VVT mechanism that modifies a phase of a second valve provided to a second cylinder, which is separate from the first cylinder, within the range extending from the first phase to the second phase. The abnormality diagnosis apparatus includes: a rotation variation amount detection unit that detects a rotation variation amount of an output shaft of the internal combustion engine; and a diagnosis unit that adjusts the phase of the first valve and the phase of the second valve to the first phase, and diagnoses the presence of an abnormality on the basis of the detected rotation variation amount of the output shaft of the internal combustion engine in a state where the phase of the first valve and the phase of the second valve are at the first phase.

According to this constitution, both the phase of the first valve varied by the first VVT mechanism and the phase of the second valve varied by the second VVT mechanism are set at a most retarded phase or a most advanced phase, which are determined mechanically. In this state, the presence of an abnormality is diagnosed on the basis of the rotation variation amount of the output shaft. Hence, the presence of an abnormality can be diagnosed on the basis of the rotation variation amount of the output shaft of the internal combustion engine in a state where the phase of the first valve varied by the first VVT mechanism and the phase of the second valve varied by the second VVT mechanism are identical. Thus, a phase difference between the valves of the cylinders can be excluded from factors causing rotation variation in the output shaft of the internal combustion engine, and as a result, an abnormality diagnosis apparatus for an internal combustion engine that is capable of diagnosing the presence of an abnormality with precision can be provided.

This apparatus according to this aspect may further include a control unit that executes control such that the phase of the first valve and the phase of the second valve vary in accordance with a load of the internal combustion engine and a rotation speed of the output shaft of the internal combustion engine, and when the load of the internal combustion engine is not smaller than a first load and not larger than a second load, which is larger than the first load, and the rotation speed of the output shaft of the internal combustion engine is not larger than a predetermined rotation speed, the diagnosis unit may adjust the phase of the first valve and the phase of the second valve to the first phase and diagnose the presence of an abnormality on the basis of the rotation variation amount of the output shaft of the internal combustion engine in a state where the phase of the first valve and the phase of the second valve are at the first phase.

According to this constitution, the phase of the first valve and the phase of the second valve are varied in accordance with the load of the internal combustion engine and the rotation speed of the output shaft. Hence, as a vehicle installed with the internal combustion engine as a drive source travels, the phase of the first valve and the phase of the second valve may vary successively in accordance with successive variation in the load of the internal combustion engine and the rotation speed of the output shaft. Accordingly, a difference between the phase of the first valve and the phase of the second valve may also occur due to individual differences between the first VVT mechanism and the second VVT mechanism. However, when the load of the internal combustion engine is not smaller than the first load and not larger than the second load and the rotation speed of the output shaft of the internal combustion engine is not larger than the predetermined rotation speed, both the phase of the first valve varied by the first VVT mechanism and the phase of the second valve varied by the second VVT mechanism are set at the most retarded phase or the most advanced phase, which are determined mechanically. In this state, the presence of an abnormality is diagnosed on the basis of the rotation variation amount of the output shaft. Hence, even when the vehicle is traveling, the presence of an abnormality can be diagnosed on the basis of the rotation variation amount of the output shaft of the internal combustion engine in a state where the phase of the first valve varied by the first VVT mechanism and the phase of the second valve varied by the second VVT mechanism are identical.

In this apparatus according to this aspect, the first valve may be a first intake valve, the second valve may be a second intake valve, and the first phase may be a most retarded phase.

According to this constitution, the phases of the intake valves are set at the most retarded phase during the abnormality diagnosis. In so doing, an overlap between the intake valve and an exhaust valve can be reduced to a minimum. Accordingly, an internal Exhaust Gas Recirculation (EGR) amount can be reduced, leading to a reduction in the effect of the internal EGR on the rotation variation of the output shaft. As a result, the presence of an abnormality can be diagnosed on the basis of the rotation variation amount of the output shaft of the internal combustion engine with an even greater degree of precision.

Another of the embodiments relates to an abnormality diagnosis apparatus for an internal combustion engine provided with a first VVT mechanism that modifies a phase of a first valve provided to a first cylinder within a range extending from a first phase to a second phase and a second VVT mechanism that modifies a phase of a second valve provided to a second cylinder, which is separate from the first cylinder, within the range extending from the first phase to the second phase. This abnormality diagnosis apparatus includes: a rotation variation amount detection unit that detects a rotation variation amount of an output shaft of the internal combustion engine; a first phase detection unit that detects the phase of the first valve; a second phase detection unit that detects the phase of the second valve; and a diagnosis unit that diagnoses the presence of an abnormality on the basis of the detected rotation variation amount of the output shaft of the internal combustion engine when a predetermined condition including a condition under which the detected phase of the first valve and the detected phase of the second valve are identical is satisfied.

According to this constitution, when the phase of the first valve and the phase of the second valve are identical, the presence of an abnormality is diagnosed on the basis of the rotation variation amount of the output shaft. When the phase of the first valve and the phase of the second valve are different, the abnormality diagnosis based on the rotation variation amount of the output shaft is not performed. Thus, a phase difference between the valves of the cylinders can be excluded from factors causing rotation variation in the output shaft of the internal combustion engine, and as a result, an abnormality diagnosis apparatus for an internal combustion engine that is capable of diagnosing the presence of an abnormality with precision can be provided.

This apparatus according to this aspect may further include a control unit that executes control such that the phase of the first valve and the phase of the second valve vary in accordance with a load of the internal combustion engine and a rotation speed of the output shaft of the internal combustion engine, and the predetermined condition may include, in addition to the condition under which the phase of the first valve and the phase of the second valve are identical, a condition under which the load of the internal combustion engine is not smaller than a first load and not larger than a second load, which is larger than the first load, and the rotation speed of the output shaft of the internal combustion engine is not larger than a predetermined rotation speed.

According to this constitution, the phase of the first valve and the phase of the second valve are varied in accordance with the load of the internal combustion engine and the rotation speed of the output shaft. Hence, as a vehicle installed with the internal combustion engine as a drive source travels, the phase of the first valve and the phase of the second valve may vary successively in accordance with successive variation in the load of the internal combustion engine and the rotation speed of the output shaft. Accordingly, a difference between the phase of the first valve and the phase of the second valve may also occur due to individual differences between the first VVT mechanism and the second VVT mechanism. However, when the phase of the first valve and the phase of the second valve are identical in an operating region where the load of the internal combustion engine is not smaller than the first load and not larger than the second load and the rotation speed of the output shaft of the internal combustion engine is not larger than the predetermined rotation speed, the presence of an abnormality is diagnosed on the basis of the rotation variation amount of the output shaft. Hence, even when the vehicle is traveling, the presence of an abnormality can be diagnosed on the basis of the rotation variation amount of the output shaft of the internal combustion engine in a state where the phase of the first valve varied by the first VVT mechanism and the phase of the second valve varied by the second VVT mechanism are identical.

The embodiments also relate to an abnormality diagnosis method for an internal combustion engine provided with a first VVT mechanism that modifies a phase of a first valve provided to a first cylinder and a second VVT mechanism that modifies a phase of a second valve provided to a second cylinder. The abnormality diagnosis method includes: detecting a rotation variation amount of an output shaft of the internal combustion engine; and diagnosing the presence of an abnormality in the internal combustion engine on the basis of the detected rotation variation amount of the output shaft of the internal combustion engine when the phase of the first valve matches the phase of the second valve.

In this method, the presence of an abnormality in the internal combustion engine may be diagnosed when a load of the internal combustion engine is not smaller than a first load and not larger than a second load, which is larger than the first load, and a rotation speed of the output shaft of the internal combustion engine is not larger than a predetermined rotation speed.

In this method, the first valve may be a first intake valve, the second valve may be a second intake valve, and the presence of an abnormality in the internal combustion engine may be diagnosed when the phase of the first valve and the phase of the second valve are aligned at a most retarded phase.

While some embodiments of the invention have been illustrated above, it is to be understood that the invention is not limited to detailed of the illustrated embodiments, but may be embodied with various changes, modifications or improvements, which may occur to those skilled in the art, without departing from the scope of the invention.

What is claimed is:

1. An abnormality diagnosis method for an internal combustion engine installed in a vehicle, the internal combustion engine provided with a first variable valve timing mechanism that modifies a phase of a first intake valve provided to a first cylinder within a range extending from a first phase to a second phase and a second variable valve timing mechanism that modifies a phase of a second intake valve provided to a second cylinder, which is separate from the first cylinder, within the range extending from the first phase to the second phase, the abnormality diagnosis method comprising:
  detecting a rotation variation amount of an output shaft of the internal combustion engine;
  varying the phase of the first intake valve and the phase of the second intake valve in accordance with a load of the internal combustion engine and a rotation speed of the output shaft of the internal combustion engine;
  adjusting the phase of the first intake valve and the phase of the second intake valve to the first phase, the first phase is a most retarded phase; and
  diagnosing a presence of an air-fuel ratio abnormality on a basis of the detected rotation variation amount of the output shaft of the internal combustion engine in a state where the vehicle installed with the internal combustion engine travels and the phase of the first intake valve and the phase of the second intake valve have been adjusted to the first phase, when the load of the internal combustion engine is not smaller than a first load and not larger than a second load which is larger than the first load, and the rotation speed of the output shaft of the internal combustion engine is not larger than a predetermined rotation speed;
  wherein the first load is larger than a load of the internal combustion engine in an idling state.

2. The abnormality diagnosis method according to claim 1, further comprising:
  determining that the air-fuel ratio abnormality has occurred due to air-fuel ratio difference between the first cylinder and the second cylinder when the presence of the air-fuel ratio abnormality is diagnosed.

3. An abnormality diagnosis method for an internal combustion engine installed in a vehicle, the internal combustion engine provided with a first variable valve timing mechanism that modifies a phase of a first valve provided to a first cylinder within a range extending from a first phase to a second phase and a second variable valve timing mechanism that modifies a phase of a second valve provided to a second cylinder, which is separate from the first cylinder, within the range extending from the first phase to the second phase, the abnormality diagnosis method comprising:
  detecting a rotation variation amount of an output shaft of the internal combustion engine;
  detecting the phase of the first valve;
  detecting the phase of the second valve;
  varying the phase of the first valve and the phase of the second valve in accordance with a load of the internal combustion engine and a rotation speed of the output shaft of the internal combustion engine, and
  diagnosing a presence of an air-fuel ratio abnormality on a basis of the detected rotation variation amount of the output shaft of the internal combustion engine when the vehicle installed with the internal combustion engine travels and a predetermined condition including a first condition under which the detected phase of the first valve and the detected phase of the second valve are identical at a most advanced phase is satisfied and a second condition under which the load of the internal combustion engine is not smaller than a first load and not larger than a second load which is larger than the first load, and the rotation speed of the output shaft of the internal combustion engine is not larger than a predetermined rotation speed is satisfied;
  wherein the first load is larger than a load of the internal combustion engine in an idling state, and the first load and the second load together define a medium-load region of the engine.

4. The abnormality diagnosis method according to claim 3, further comprising:
  determining that the air-fuel ratio abnormality has occurred due to air-fuel ratio difference between the first cylinder and the second cylinder when the presence of the air-fuel ratio abnormality is diagnosed.

5. An abnormality diagnosis method for an internal combustion engine installed in a vehicle, the internal combustion engine provided with a first variable valve timing mechanism that modifies a phase of a first intake valve provided to a first cylinder and a second variable valve timing mechanism that modifies a phase of a second intake valve provided to a second cylinder, the method comprising:

detecting a rotation variation amount of an output shaft of the internal combustion engine; and diagnosing a presence of an air-fuel ratio abnormality in the internal combustion engine on a basis of the detected rotation variation amount of the output shaft of the internal combustion engine when the vehicle installed with the internal combustion engine travels and the phase of the first intake valve and the phase of the second intake valve have been adjusted to match;

wherein the presence of the air-fuel ratio abnormality in the internal combustion engine is diagnosed when a load of the internal combustion engine is not smaller than a first load and not larger than a second load, which is larger than the first load, and a rotation speed of the output shaft of the internal combustion engine is not larger than a predetermined rotation speed;

wherein the first load is larger than a load of the internal combustion engine in an idling state;

wherein the presence of the air-fuel ratio abnormality in the internal combustion engine is diagnosed when the phase of the first intake valve and the phase of the second intake valve are aligned at a most retarded phase.

6. The abnormality diagnosis method according to claim 5, wherein the presence of the air-fuel ratio abnormality in the internal combustion engine is diagnosed when the phase of the first intake valve and the phase of the second intake valve are aligned at a most advanced phase.

7. The abnormality diagnosis method according to claim 5, further comprising:

determining that the air-fuel ratio abnormality has occurred due to air-fuel ratio difference between the first cylinder and the second cylinder when the presence of the air-fuel ratio abnormality is diagnosed.

8. An abnormality diagnosis method for an internal combustion engine installed in a vehicle, the internal combustion engine provided with a first variable valve timing mechanism that modifies a phase of a first intake valve provided to a first cylinder within a range extending from a first phase to a second phase and a second variable valve timing mechanism that modifies a phase of a second intake valve provided to a second cylinder, which is separate from the first cylinder, within the range extending from the first phase to the second phase, the abnormality diagnosis method comprising:

detecting a rotation variation amount of an output shaft of the internal combustion engine;

varying the phase of the first intake valve and the phase of the second intake valve in accordance with a load of the internal combustion engine and a rotation speed of the output shaft of the internal combustion engine;

adjusting the phase of the first intake valve and the phase of the second intake valve to the first phase, the first phase is a most advanced phase; and diagnosing a presence of an air-fuel ratio abnormality on a basis of the detected rotation variation amount of the output shaft of the internal combustion engine in a state where the vehicle installed with the internal combustion engine travels and the phase of the first intake valve and the phase of the second intake valve have been adjusted to the first phase, when the load of the internal combustion engine is not smaller than a first load and not larger than a second load which is larger than the first load, and the rotation speed of the output shaft of the internal combustion engine is not larger than a predetermined rotation speed;

wherein the first load is larger than a load of the internal combustion engine in an idling state, and the first load and the second load together define a medium-load region of the engine.

* * * * *